United States Patent Office 3,493,540
Patented Feb. 3, 1970

3,493,540
POLYIMIDES WHICH ARE SOLUBLE IN ORGANIC SOLVENTS
Gerhard Muller, Rudolf Merten, and Willi Dunwald, Leverkusen, and Karl-Heinz Mielke, Cologne-Stammheim, Germany, assignors to Farbenfabriken Bayer Aktiengesellschaft, Leverkusen, Germany, a corporation of Germany
No Drawing. Continuation of application Ser. No. 473,237, July 19, 1965. This application Jan. 15, 1969, Ser. No. 793,236
Claims priority, application Germany, July 21, 1964, F 43,517
Int. Cl. C08g 22/16
U.S. Cl. 260—47                      5 Claims

ABSTRACT OF THE DISCLOSURE

Process for production of polyimides comprising reacting bis-trimellitic anhydride alkylene esters with an organic diisocyanate.

CROSS REFERENCE TO RELATED APPLICATION

This application is a continuation of application Ser. No. 473,237 as filed July 19, 1965, and now abandoned.

This invention relates to polyimide compositions and more particularly to a novel process for preparing polyimides which are soluble in organic solvents.

Aromatic polyimides have recently become of considerable interest on account of their outstanding resistance to high temperatures. They may be prepared by a number of known processes, for example by the direct condensation of diamines with aromatic tetracarboxylic acids and tetracarboxylic acid esters, in which two carboxyl groups and two ester groups, respectively, are located in the ortho-position relative to one another, or with tetra-carboxylic acid dianhydrides. Unfortunately, these processes can only be used to a limited extent because products are obtained which are often practically insoluble in all organic solvents, and, in some instances, are even infusible and therefore very difficult to process. Other processes circumvent this difficulty by the addition of diamines to tetracarboxylic acid dianhydrides in a strongly polar anhydrous solvent, for example in dimethyl formamide, dimethyl sulphoxide or N-methyl pyrrolidone or mixtures thereof. In this way, soluble intermediates with the structure of polyamide polycarboxlic acids are initially prepared and are converted into insoluble polyimides in a in a second stage by the action of heat or under the influence of chemicals. Unfortunately, processes of this type have the disadvantage that the solutions of the polyamide polycarboxylic acids which are used only have a fairly small solids content and are only stable to a limited extent, because prolonged storage initiates cylisation of the amide carboxylic acid groupings to form the imide ring, accompanied by the elimination of water.

It is, therefore, an object of this invention to provide a novel process for the preparation of polyimides. Another object of this invention is to provide for a method for preparing polyimides which are soluble in organic solvents. Still a further object of this invention is to provide organic solvent solutions of polyimides which are distinguished by their storage life. Still a further object of this invention is to provide compositions useful for the manufacture of lacquers, films or foils, which are resistant to high temperatures. The foregoing object and others which will become apparent from the following description are accomplished in accordance with this invention, generally speaking, by providing a process for the preparation of polyimides which involves reacting substantially equimolar amounts of bis-trimellitic anhydride alkylene esters and organic diisocyanates, if desired masked diisocyanates, at temperatures in the range from 50 to 250° C.

The reaction of the anhydride function with an isocyanate group is, in this case, accompanied by the elimination of carbon dioxide and by the formation of an imide grouping. The process according to the invention can be illustrated by the following reaction diagram:

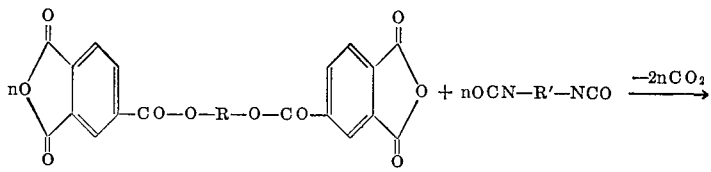 + nOCN—R'—NCO 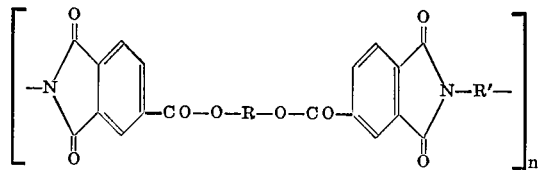

Surprisingly, the resulting high molecular weight polyimides are readily soluble in suitable organic solvents, whilst polyimides similarly prepared from, for example, pyromellitic dianhydride, 3,4,3',4'-benzophenone tetracarboxylic acid dianhydride or 3,4,3',4'-diphenyl tetracarboxylic acid dianhydride, with corresponding diisocyanates, optionally masked diisocyanates are insoluble. The concentration of the polyimide solutions which may be prepared in the novel way can vary within wide limits without any danger of precipitation. In addition, the polyimide solutions thus obtained are distinguished by their long storage life.

The bis-trimellitic anhydride alkylene esters used as starting compounds for the process according to the invention, correspond to the following structural formula:

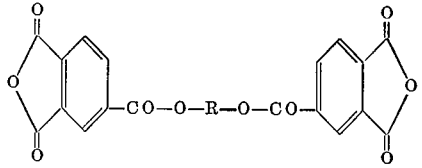

wherein R represents a saturated or unsaturated bivalent aliphatic or cycloaliphatic radial which may comprise aromatic, cycloaliphatic or heterocyclic ring systems as well as ether, ester sulphide, sulphoxide or sulphone bridges and which may, if desired, be substituted by chlorine, bromine or iodine atoms or by nitro or alkoxy groups.

The following radicals are typical examples of R: sulphide, sulphoxide or sulphone bridges and which may optionally be substituted by chlorine, bromine or iodine atoms or by nitro, alkoxy or mercapto groups.

The following radicals are typical examples of R:

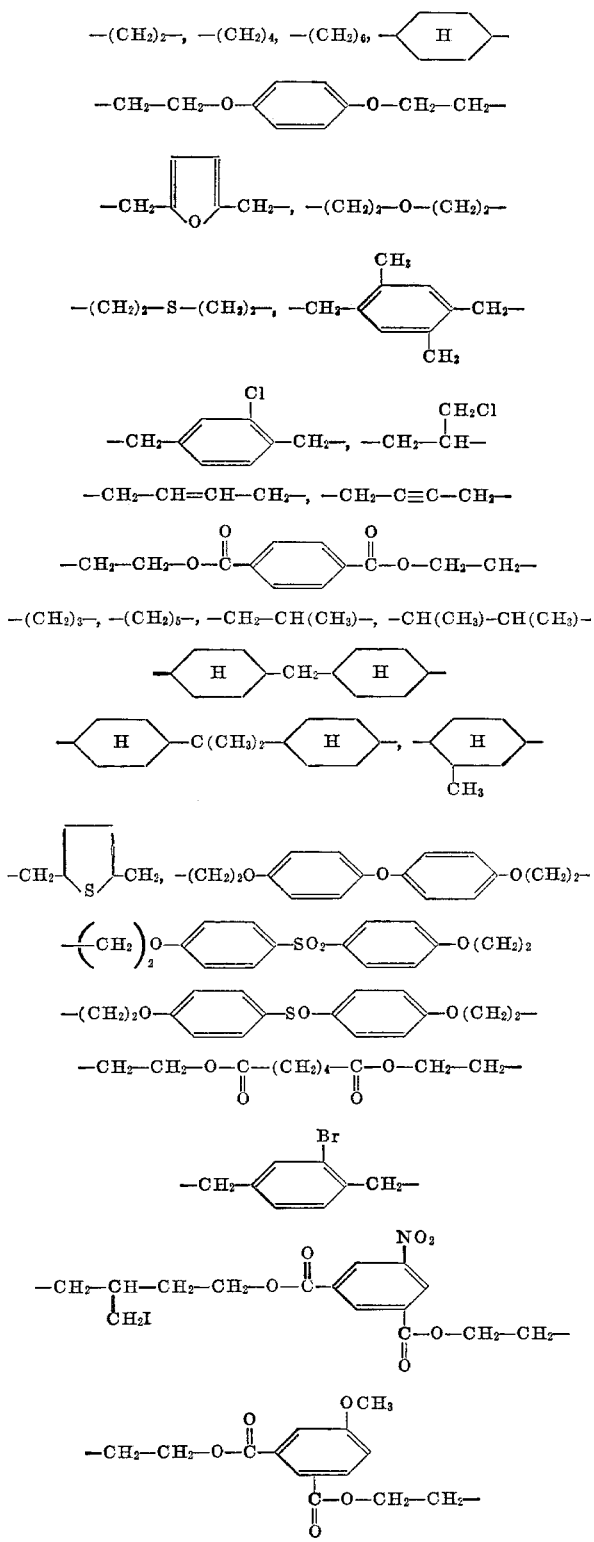

The bis-trimellitic anhydride alkylene esters used in the present invention are easily prepared by known esterification methods involving trimellitic acid anhydride and the diols HO—R—OH, especially in form of their diacetates, that is by transesterification at elevated temperatures.

The following are examples of organic diisocyanates: aliphatic diisocyanates such as butane, hexane and heptane diisocyanates, aliphatic diisocyanates incorporating ring systems such as ω,ω'-diisocyanato - 1,3-dimethylbenzene, ω,ω'-diisocyanato-1,4-dimethyl cyclohexane, ω,ω'-diisocyanato-1,4-diethyl benzene, cyclohexane-1,3-, cyclohexane-1,4- and 1-methylcyclohexane-2,4-diisocyanates and dicyclohexylmethane-4,4'-diisocyanates. Further mixed aromatic-aliphatic and aromatic-hydroaromatic diisocyanates, such as 4-phenylisocyanatomethyl isocyanate, tetrahydronaphthylene - 1,5, hexahydrodiphenyl - 4,4'- and hexahydrodiphenylmethane - 4,4'-diisocyanates, diisocyanates of benzene and its homologues, for example 1,3-phenylene-, 1,4-phenylene-, 1-methylbenzene-2,4- and 1-methylbenzene-2,6-diisocyanates, as well as their isomer mixtures, naphthalene - 1,4-, naphthalene - 1,5-, biphenyl-4,4'-, diphenylmethane-4,4'-, anthraquinone-2,6- and diphenylsulphide-2,4-diisocyanates.

The isocyanates used in accordance with the invention may also be substituted by halogen, alkoxy, azo, nitro, cyano, ester or sulphone groups. Examples of such isocyanates are 1-chlorobenzene-, 1-nitrobenzene and 1-methoxybenzene-2,4-diisocyanates, azobenzene-4,4'-diisocyanate and diphenyl sulphone-4,4'-diisocyanate.

The diisocyanates used may of course also be employed in masked form for the reaction according to the invention. Masked isocyanates are the reaction products, which are fairly readily dissociated under the influence of heat, of isocyanates and other compounds for example, phenols, bisulphite, malonic esters, ε-caprolactam, α-pyrrolidone or compounds containing active methylene groups.

To carry out the process, the reaction components are brought together under substantially anhydrous conditions, preferably in solvents which are inert under the reaction conditions. Suitable solvents include (halogen)-hydrocarbons, phenols, esters, ketones, ethers, substituted amides, sulphoxides and sulphones, for example xylene, toluene, o-dichlorobenzene, phenol, cresol, acetone, acetophenone, ethyl acetate, ethylene glycol monoethyl ether acetate, N-methyl pyrrolidone, dimethyl formamide, dimethyl acetamide, dimethyl sulphoxide, dimethyl sulphone, tetramethyl urea, or mixtures thereof. Phenols behave as inert solvents under the reaction conditions. Phenols and cresols are preferred. The reaction is preferably carried out under the protection of an inert gas, such as nitrogen or argon.

In the process according to the invention, the polyimides may be prepared by the direct reaction of bis-trimellitic anhydride alkylene esters with diisocyanates, if desired masked diisocyanates. It may even be advantageous, however, to add acid catalysts in anhydrous form, for example catalysts of the Lewis acid type, of which the following are examples: boron trifluoride and its adducts, for example with ether or acetic acid; sulphuric acid; p-toluene sulphonic acid; ferric chloride; stannic chloride and zinc chloride. It is also possible to employ as catalysts, carbamic acid chlorides; acidic ion exchangers, iron acetonyl acetonate, molybdenum glycolate, titanium tetrabutoxide, dibutyl tin diacylates or stannous acylates. Such as stannous octoate. Basic catalysts may also be added to the reaction mixture. Suitable basic catalysts include, for example, dimethyl benzylamine, triethylene diamine, permethylated diethylene triamine and N-alkyl morpholines. In some instances, potassium carbonate may be used as catalyst. The catalysts may be used in quantities from 0.1 to 10% by weight, based on dianhydride.

In order to obtain condensates of sufficiently high molecular weight, chemically equivalent amounts of the bis-trimellitic anhydride esters and the diisocyanate are preferably used, although very small variations are quite admissible. In general, the molar ratio between the bis-trimellitic anhydride ester and the, if desired masked, diisocyanate is between 1:0.9 and 1:1.1.

The reaction is carried out at temperatures from 50 to 250° C., preferably from 100 to 220° C. and is complete after a few hours. The reaction components may be added in any order. For example, the diisocyanate may be initially introduced, if desired in solution, followed by the addition of the bis-trimellitic anhydride ester as the second reaction component or vice versa. It is also possible to mix the total quantity of both components at once.

If the reaction is performed in solution, the concentration of the solution does not have a remarkable effect on the course of the reaction. It depends only on the desired concentration of the reaction product in the solvent, that is on the concentration of the composition of matter resulting from the present procedure. Solid content can vary within wide limits. A 10% solution is as possible as a content of 80%. Preferred are solid contents from 30 to 60%.

The compositions of matter containing the polyimides obtained by the process according to the invention are compositions of liquid or, with high solid content, of resinous nature useful for the manufacture of lacquers which are resistant to high temperatures, for example wire lacquers, or for the production of films and foils resistant to high temperatures. They may also be used for such purposes in admixture with other conventional raw materials, for example with terephthalic acid polyesters in the manufacture of wire lacquers (variable within wide limits). The laquers, films or foils obtained in this way are distinguished from their known counterparts by their very high resistance to heat.

EXAMPLE 1

410 parts by weight of bis-trimellitic anhydride glycol ester and 174 parts by weight of an isomer mixture of 1-methyl-benzene-2,4- and 1-methylbenzene-2,6-diisocyanates, are heated for 15 hours at 160° C. in the presence of 1 part by weight of tin octoate in 1300 parts by weight of crude cresol in a nitrogen atmosphere. The reaction is accompanied by the evolution of $CO_2$. A homogeneous viscous solution is obtained in which no more NCO groups can be detected. The infra-red spectrum of the solution shows the presence of imide groupings, whilst amide and anhydride groups cannot be detected.

250 g. of the solution thus obtained are mixed with 250 g. of a 40% by weight solution of a terephthalic acid polyester in cresol. A cooled solution of 1 g. of butyl titanate in 20 g. of cresol which had previously been heated for 10 minutes at 120° C., is then added. The terephthalic acid polyester introduced is prepared in known manner by heating 384 g. of dimethyl terephthalate 93 g. of glycol and 46 g. of glycerol in the presence of 0.5 g. of litharge as catalyst.

Copper wire is laquered at a rate of 4 to 7 m./min. in a vertical, 4m.-long wire-enamelling machine at an oven temperature of 350° C. After it has been passed through the machine 6 times, the 0.7 mm.-thick copper wire has undergone an increase in diameter of about 55μ.

The resulting enamelled wire exhibits an outstanding winding strength. It can be wound around a 0.7 mm.-diameter mandrel without cracking, even when it has been stretched beforehand by 20%.

A coil prepared by winding the copper wire around a mandrel with the same diameter as the wire, remains unaffected by thermal shock treatment up to temperatures of 200° C. and higher, i.e. no cracks can be detected in the coil after it has been left for 1 hour in an oven preheated to 200° C. The pencil hardness according to DIN 46453 is 4H and remains the same even after pre-treatment in ethanol (DIN 46453), and may be regarded as an indication of a high resistance to solvents.

EXAMPLE 2

82 parts by weight of bis-trimellitic anhydride glycol ester are heated for 15 minutes at 150° C. in 400 parts by weight of crude cresol. 50.4 parts by weight of 4,4'-diisocyanotodiphenyl ether and 0.3 part by weight of tin octoate are then added in portions at 150° C. The mixture is heated for 20 hours at 150° C. in a nitrogen atmosphere, $CO_2$ being evolved. A homogeneous viscous solution is obtained in which imide groupings can be detected by infra-red spectroscopy. No amide and anhydride groups can be detected.

A deep-drawn metal sheet coated with this lacquer is stored for 30 minutes at 200° C. A lacquer film is obtained which can be dented to a depth of 0.7 mm. without cracking in the Erichsen test.

EXAMPLE 3

455 g. of the polyimide solution prepared in accordance with Example 2 are mixed with 250 g. of a 40% by weight solution of the terephthalic acid polyester prepared in accordance with Example 1. A cooled solution of 0.5 g. of titanium butylate in 10 g. of cresol which had been previously heated for 10 minutes at 120° C. is added to this mixture.

Enamelling under the conditions described in Example 1 produces a dark-coloured enamelled wire which also has outstanding resistance to heat. A coil obtained by winding the enamelled wire around a 0.7 mm.-diameter mandrel readily withstands the thermal shock test carried out at a temperature of 200° C.

Even after it has been stored for over 14 days at 200° C., the enamelled wire can still be wound around a 0.7 mm.-diameter mandrel without cracking.

EXAMPLE 4

41.0 parts by weight of bis-trimellitic anhydride glycol ester (1 mol) are dissolved in 200 parts by weight of crude cresol. 25.0 parts by weight of 4,4'-diisocyanatodiphenyl methane (0.8 mol) and 0.2 part by weight of tin octoate as the catalyst are added to this solution in portions at 150° C. The mixture is left to react for 20 hours at 120° C. in a nitrogen atmosphere, after which a homogeneous, viscous solution is obtained in which imido groupings can be detected by infra-red spectroscopy. In contrast, the infra-red spectrum does not contain any bands for amide and anhydride groups.

To 364 g. of this solution there are added a 250 g. of a 40% by weight solution of the terephthalic acid polyester prepared in accordance with Example 1 in a solvent mixture of cresol and xylene (7:3 by weight), and a solution of 1 g. of titanium butylate in 10 g. of cresol which had been previously heated for 10 minutes at 120° C. and then left to cool.

When tested in accordance with DIN 46453, an enamelled wire prepared with this lacquer mixture under the conditions specified in Example 1 shows outstanding properties and, in addition, exhibits outstanding thermal shock properties (tested as in Example 1) and high impact strengths (tested in accordance with NEMA using twisted wire specimens).

It is to be understood that this invention is not limited by examples, but that any of the compositions, esters and diisocyanates, mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

We claim:

1. A high molecular weight organic solvent soluble reaction product of substantially equimolar amounts of a bis-trimellitic anhydride alkylene ester and an organic diisocyanate, said reaction product having been produced by heating under substantially anhydrous conditions at temperatures in the range from 50 to 250° C.

2. The product of claim 1 dissolved in an inert organic solvent.

3. The reaction product of claim 1 wherein said organic diisocyanate is selected from the group consisting of toluylene diisocyanate, 4,4′-diisocyanato diphenyl ether and 4,4′-diisocyanato diphenyl methane and said ester is bis-trimellitic anhydride ethylene glycol ester.

4. The product of claim 3 dissolved in an inert organic solvent.

5. The product of claim 1 wherein said alkylene ester is bis-trimellitic anhydride glycol ether and said diisocyanate is 4,4′-diisocyanato diphenyl methane.

References Cited

UNITED STATES PATENTS

| | | | |
|---|---|---|---|
| 3,314,923 | 4/1967 | Muller et al. | 260—78 |
| 3,355,427 | 11/1967 | Loncrini | 260—47 |

WILLIAM H. SHORT, Primary Examiner

L. L. LEE, Assistant Examiner

U.S. Cl. X.R.

260—30.8, 31.2, 32.4, 32.6, 32.8, 33.2, 33.4, 33.8, 77.5; 117—161